3,041,369
DI-(2-BUTOXYETHOXYETHYL)
NORCAMPHORATE
Samuel C. Temin, Pittsburgh, Pa., assignor to Koppers Company, Inc., a corporation of Delaware
No Drawing. Filed June 8, 1960, Ser. No. 34,649
1 Claim. (Cl. 260—468)

This invention relates to diesters of cycloaliphatic acids. In one specific aspect, it relates to novel diesters of norcamphoric acid, cis-cyclopentane-1,3-dicarboxylic acid. In another aspect, it relates to the use of these esters as plasticizers and softeners for thermoplastic resins.

Certain esters of norcamphoric acid have been reported in the literature. Pospischill, Ber. 81, 1951 (1898), was the first to make the dimethyl ester of norcamphoric acid and later Birch and Dean, J. Chem. Soc., 1953, 2477, prepared diethyl norcamphorate. Unfortunately, the instability of these two known esters to hydrolysis and certain of their other physical properties and performance characters make them little more than laboratory curiosities. Quite surprisingly, I have discovered a new class of norcamphoric acid esters which, although they are structurally similar to the known compounds, possess properties and utility which are completely unobvious in view of the known art. I have found that my new compounds possess, inter alia, exceptional utility as plasticizers and softeners for thermoplastic resins, e.g. vinyl and cellulosic resins; lubricants; and temperature stable hydraulic fluids.

In the evaluation of a chemical compound as a plasticizer for a thermoplastic resin, e.g. a vinyl resin or polymer, the most important criteria in so far as performance is concerned, are permanence, temperature behavior, and stability to heat and light. Permanence is conveniently determined by measuring, on a comparative basis, the volatility of a given compound from a plasticized resinous specimen. A material which is impermanent is obviously unsatisfactory as a plasticizer, since its escape from the treated resin results in embrittlement and a general deterioration of the properties of the resin. Permanence is particularly important in connection with the vinyl resins, since unplasticized vinyl resins have limited utility.

The temperature behavior of plasticized resinous compositions is important, since most plastic articles are subject to the wide variations in temperature incurred in everyday life. In military applications, the extremes are greater, since an article in a matter of a few minutes may be transferred from hot summer temperatures on the ground to sub-zero temperatures high in the air. Thus, one of the essential properties of a good plasticizer is its ability to impart to the plasticized resin relatively uniform mechanical properties over a broad temperature range. Change in viscosity and change of phase from solid to liquid over a given temperature range are indicia of the temperature behavior of a particular compound when used as a plasticizer.

The heat and light stability of a plasticized resin are particularly significant in the manufacture of plastic articles for household use, since the stability of the article against discoloration is an important aesthetic consideration. Under relatively high heat, some plastics, particularly the vinyl resins, darken; under prolonged exposure to light such plastics may discolor and stiffen or become tacky. The plasticizer is usually adequately stable to heat or light; its stability is generally far better than that of the resin. However, the stability of the plasticized resin is so dependent on the nature of the plasticizer that the evaluation of heat and light stability of the plasticized composition assumes great practical importance.

In my study of the use of norcamphoric acid esters as plasticizers, I have found that the known di-methyl and di-ethyl esters are hydrolytically unstable, impermanent, marginal in their temperature behavior, and unstable to heat and light. Thus, as plasticizers, they are substantially useless. Astonishingly, the novel norcamphoric acid esters of the invention have a degree of permanence comparable to commercial plasticizers, a low temperature performance that is exceptional even when compared to plasticizers now in commercial use, and remarkable stability to both heat and light.

It is therefore an object of the present invention to provide a new class of norcamphoric acid esters which have outstanding utility as plasticizers, softeners, lubricants and hydraulic fluids.

In accordance with the invention, I have discovered norcamphoric acid esters of the formula:

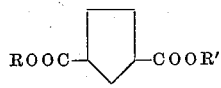

In the above formula, R and R' are alkyl radicals having from 6–13 carbon atoms, cycloalkyl radicals having from 6–13 carbon atoms, aralkyl lower alkoxy lower alkyl radicals or poly lower alkoxy lower alkyl radicals.

The norcamphoric acid esters of the invention are most conveniently prepared by the esterification of norcamphoric acid. Alcohols useful in this esterification include hexyl, heptyl, octyl, nonyl, decyl, dodecyl, benzyl, cyclohexyl, 2-ethylhexyl, diethylene glycol monomethylether, diethylene glycol monoethylether, diethylene glycol monobutylether, ethylene glycol monomethylether, ethylene glycol monoethylether, ethylene glycol monobutylether, and the like. Also useful are mixed alcohols, such as the so-called oxo alcohols made by the oxo process. The most commercially significant oxo alcohols are isooctyl alcohol (80% isomeric dimethyl-1-hexanols, 15% isomeric methyl heptanols-1, and 5% unidentified), nonyl alcohol, decyl alcohol (isomeric trimethyl heptanols) and tridecyl alcohol (isomeric tetramethyl nonanols).

The esterification reaction is preferably run at atmospheric pressure at a temperature ranging between 100–200° C., a convenient temperature generally being the reflux temperature of the reaction mixture. The mole ratio of the reactants is not particularly critical, although it is generally helpful to provide an excess of the alcohol as a solvent medium. The reaction is effectively catalyzed using a conventional acid catalyst, such as hydrochloric acid, sulfuric acid, p-toluene-sulfonic acid and the like. The use of a water entraining solvent is helpful in shortening the reaction time. The reaction mixture is heated at a temperature within the above-indicated range until the stoichiometric amount of water has been evolved. Alternatively, the ester of the invention can be prepared by reaction of norcamphoryl chloride with the desired alcohol.

After reaction is complete, the reaction mixture is neutralized with sufficient quantity of base, such as an alkali metal hydroxide, alkali metal carbonate, or alkaline earth hydroxide or carbonate. The product norcamphoric acid ester is recovered from the reaction mixture, preferably by conventional distillation techniques, or by other suitable means such as low temperature "crystallization" etc.

The norcamphoric acid esters of the invention have remarkably low freezing points and high boiling points. For example, di-(2-ethylhexyl) norcamphorate does not freeze at temperatures as low as −80° C. The boiling point of this ester is over 190° C. at 2 mm. of Hg. The wide temperature range between the freezing point and boiling point of the new norcamphoric acid esters contributes significantly to the excellent low temperature plasticizing properties of these compounds, since they do not undergo a change in phase when the plasticized article is subjected to extremely low temperatures. Unexpectedly, the di-(2-ethylhexyl) norcamphorate has a freezing point at least 50° below that of the corresponding di-ethyl ester. Commercial plasticizers, such as di-cyclohexyl phthalate and di-cyclohexyl adipate melt at much higher temperatures, 58° C. and 40° C. respectively.

My new esters are exceptional plasticizers for virtually every type of thermoplastic resin requiring plasticization. Thus, the new norcamphorates serve as useful plasticizers when admixed in an amount ranging about between 10–120% by weight, based on the weight of resin, with vinyl polymers such as polyvinylchloride, chlorinated polyethylene or polypropylene, polyvinyl butyral, polyvinyl acetate, co-polymers of vinylacetate and vinylchloride; vinyl aromatics such as styrene, alphamethyl styrene and the like; cellulosic resins such as nitrocellulose, cellulose acetate, ethyl cellulose, mixed cellulose esters, e.g. cellulose acetate propionate and the like; synthetic rubbers, such as styrene-butadiene co-polymers and styrene-acrylonitrile co-polymers, chlorinated rubber; vinylidenechloride-acrylonitrile co-polymers, natural resins and gums, and certain acrylates. The norcamphorates also can be used as plasticizers for lacquer coatings based on polystyrene, polyvinyl butyral, chlorinated rubber, and urea-formaldehyde resins.

In addition to their use as plasticizers and softeners, my new compounds are surprisingly effective as hydraulic fluids. This is particularly true for aeronautical applications, since in such applications, the likelihood of incurring sub-zero temperatures is greatly enhanced. From the standpoint of safety, one of the important features of a hydraulic fluid is its stability to hydrolysis, since a mechanical failure in a hydraulic system may result in water bleeding into the lines containing the fluid. In contrast with the known di-methyl and diethyl norcamphorates, my novel esters are hydrolytically stable, even after exposure to water at elevated temperatures for a prolonged period of time.

My invention is further illustrated by the following examples. In the examples, the word "parts" refers to parts by weight.

EXAMPLE I

*Di-(2-Ethylhexyl) Norcamphorate*

A mixture of 15.8 parts norcamphoric acid, 31 parts of 2-ethyl-hexanol-1 and 2 parts of concentrated sulfuric acid was heated at 120–130° C. for four and one-half hours. Then sodium carbonate, 4 parts, was added to neutralize the sulfuric acid and the mixture distilled in vacuo. After 6 parts forerun and intermediate fraction were obtained, the product, di(2-ethylhexyl) norcamphorate, was collected. The new diester boiled at 190–200° C. at 0.25 mm. Hg. The yield was 30 parts, representing 78.5% of the theoretical yield based on the norcamphoric acid used. An analytical sample had $n_D^{22}=1.4568$ and did not freeze at −80° C. The ester was a good solvent for polystyrene. The ester was tested for viscosity and the values found in Table I obtained.

TABLE I

| Temp. (° F.): | Viscosity (centistokes) |
|---|---|
| −67 | 9.190 |
| −40 | 1.148 |
| 100 | 9.32 |
| 200 | 2.92 |

EXAMPLE II

*Didodecyl Norcamphorate*

To a solution of 18.65 parts lauryl (dodecyl) alcohol in 200 parts of dry benzene was added, with stirring, a solution of 0.75 parts norcamphoryl chloride in 50 parts of dry benzene. (The norcamphoryl chloride was prepared by reacting norcamphoric acid with thionyl chloride. It had a boiling point of 85–9° C. at 1 mm. of mercury and had $n_D^{25}=1.4947$.) The solution was heated under reflux for 90 minutes, then cooled and extracted with 10% sodium bicarbonate solution until free of acid. The benzene solution was then washed with water until neutral and dried over anhydrous sodium sulfate. After filtration, the benzene solution was evaporated leaving a thick liquid residue of di(dodecyl) norcamphorate. The ester was dissolved in n-hexane at room temperature and cooled to 0° C., whereupon it crystallized out of solution, and was separated by filtration. It had $n_D^{31}$ 1.5819. The infra-red absorption spectrum was that expected for di(dodecyl) norcamphorate. A sample was subjected to elemental analysis to give values of C, 75.3%; H, 11.9%. The theoretical values for the expected compound are C, 75.25%; H, 11.8%.

EXAMPLE III

*Dicyclohexyl Norcamphorate*

A mixture of 215 parts norcamphoric acid, 350 parts of cyclohexanol and 5 parts of concentrated sulfuric acid was heated for 6 hours at 135° C. The mixture was cooled and 10 parts sodium carbonate added. After filtration the filtrate was distilled. There was obtained 364 parts of dicyclohexyl norcamphorate boiling at 190–5° C. at 1 mm. mercury pressure. The ester had $n_D^{26}=1.4820$. The viscosity of the ester was measured at various temperatures as shown in Table II.

TABLE II.—VISCOSITY OF DICYCLOHEXYL NORCAMPHORATE

| Temp. (° F.): | Viscosity (centistokes) |
|---|---|
| −4 | 10.460 |
| +14 | 2.303 |
| 100 | 51.7 |
| 200 | 8.11 |

EXAMPLE IV

*Di(2-Butoxyethoxyethyl) Norcamphorate*

To 177 parts of butyl Carbitol, $$C_4H_9OCH_2OCH_2CH_2OH$$

was added 97.5 parts of norcamphoryl chloride over a period of one hour. A vigorous reaction occurred with evolution of hydrogen chloride. After the exothermic reaction was over, the mixture was heated at 80–90° C. for three hours. The reaction product was then poured into a solution of 50 parts sodium carbonate in 500 parts of water. The upper organic layer was separated and the aqueous layer extracted three times, each with 100 parts of diethyl ether. The combined organic layers were dried over anyhdrous magnesium sulfate and then distilled. There was collected 155 parts of di(2-butoxyethoxyethyl) norcamphorate boiling at 195–8° C. at 0.1 mm. of mercury. Infrared examination confirmed the structure.

EXAMPLE V

*Diethyl Norcamphorate*

A mixture of 316 parts norcamphoric acid, 1400 parts of 95% ethyl alcohol, 1200 parts of benzene, and 150 parts of concentrated sulfuric acid were heated under reflux. The heating vessel was connected to an apparatus that permitted the withdrawal of water while organic condensate was returned to the vessel. After the required amount of water, 142 parts, had been collected, the contents of the vessel were cooled and treated with a solution of 350 parts sodium carbonate in 1000 parts of water.

The organic layer was separated and the aqueous layer extracted with diethyl ether. The combined organic layers were dried over anhydrous sodium sulfate, filtered, and distilled. The diethyl norcamphorate was collected as a fraction boiling at 128° C. at 8 mm. of mercury. A freezing point of −36.13°±0.05° C. was determined for the ester. It has a viscosity of 2.75 centistokes at 100° F. (density 1.037) and a viscosity of 1.42 centistokes at 200° F. (density 0.988).

EXAMPLE VI

*Heat and Light Stability of Plasticized Polyvinylchloride Resins*

Two parts by weight of unplasticized polyvinylchloride resin ("Geon 121") was mixed with one part by weight di-(2-ethylhexyl) norcamphorate and the mixture was stabilized with 1.2% by weight of a basic lead sulfate stabilizer available commercially as "Dutch Boy TriBase." A second mixture was made, substituting diethyl norcamphorate for the di-(2-ethylhexyl)norcamphorate. A control sample was prepared, using commercial "dioctyl" sebacate as the plasticizer.

The three mixes were separately blended in a Brabender Plastigraph for 6 minutes at 160° C. (at 63 r.p.m.). The plasticized samples thus prepared were molded at 160–170° C. for three minutes at 10 tons pressure. The sample containing the diethyl norcamphorate was soft and sticky when hot, and badly discolored (Helige color scale reading of 11–14) after molding. Quite surprisingly, the sample plasticized with di-(2-ethylhexyl) norcamphorate was colorless (Helige color of 2) and easy to handle. It resembled the similar sample made up using dioctyl sebacate, a commercially available plasticizer.

The foregoing test clearly shows that the di-(2-ethylhexyl) norcamphorate, representative of the compounds of the invention, when used as a plasticizer has excellent stability to heat and light. In contrast therewith, the diethyl norcamphorate showed very poor heat and light stability, thus making it totally unsuitable as a plasticizer.

EXAMPLE VII

*Tensile Strength of Plasticized Polyvinylchloride Resins*

Three sets of test specimens were made as described in Example VI using as plasticizers di(2-ethylhexyl) norcamphorate, diethyl norcamphorate and dioctyl sebacate. The specimens were tested on the Instron, a laboratory device for measuring tensile strength and elongation of resins and fibers. The test results are shown below in Table III.

TABLE III

| Ester used | Tensile strength (lb./sq. in.) | | Elongation (Percent) |
| --- | --- | --- | --- |
| di-(2-ethylhexyl) norcamphorate | 2,620, | 2,800 | 589, 634 |
| diethyl norcamphorate | 2,030, | 2,240 | 597, 626 |
| dioctyl sebacate | 2,180, | 2,490 | 399, 530 |

The data indicate that the resin plasticized with di-(2-ethylhexyl) norcamphorate is superior, in both tensile strength and elongation, to those plasticized with the diethyl norcamphorate and the dioctyl sebacate.

EXAMPLE VIII

*Volatility of Plasticizer*

Three specimens of molded polyvinylchloride films, about ¼" thick, were made according to the procedure of Examples VI and VII using as plasticizers, di-(2-ethylhexyl) norcamphorate, diethyl norcamphorate and dioctyl sebacate. Small disks were cut from the molded polyvinylchloride films and were tested for volatility of the plasticizer generally according to ASTM test D-1203–55. The plasticized disks were placed in activated charcoal and heated 24 hours at 125° C. Reweighing showed that the average weight loss of the sample containing di-(2-ethylhexyl) norcamphorate was 15.9%, the weight loss of the sample containing diethyl norcamphorate was 25.7% and the weight loss of the control containing dioctyl sebacate was 15.2%. These results proved that the di-(2-ethylhexyl) norcamphorate is equal to a commercially used plasticizer in volatility, whereas diethyl norcamphorate is vastly inferior.

EXAMPLE IX

*Hydrolytic Stability*

To 100 ml. of de-ionized water was added 0.5 cc. of diethyl norcamphorate and to another 100 ml. of de-ionized water was added 0.5 cc. of di-(2-ethylhexyl) norcamphorate. The two samples were heated under reflux for 72 hours, and then allowed to stand at room temperature for 64 hours. At the end of this time the diethyl ester was completely hydrolyzed as shown by titration with alkali, whereas the di(2-ethylhexyl) ester was essentially unchanged.

I claim:
Di-(2-butoxyethoxyethyl) norcamphorate.

References Cited in the file of this patent

UNITED STATES PATENTS

| | | |
| --- | --- | --- |
| 2,679,509 | Hasselstrom | May 25, 1954 |
| 2,692,207 | Blake | Oct. 19, 1954 |
| 2,759,836 | Caldwell | Aug. 21, 1956 |
| 2,840,593 | Sommers et al. | June 24, 1958 |

FOREIGN PATENTS

| | | |
| --- | --- | --- |
| 600,427 | Canada | June 21, 1960 |